United States Patent
Chang

(10) Patent No.: US 6,873,784 B2
(45) Date of Patent: Mar. 29, 2005

(54) OPTICAL ATTENUATOR

(75) Inventor: Yao-Hao Chang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 222 days.

(21) Appl. No.: 10/238,168

(22) Filed: Sep. 9, 2002

(65) Prior Publication Data

US 2003/0095780 A1 May 22, 2003

(30) Foreign Application Priority Data

Nov. 21, 2001 (TW) ........................................ 90220079 U

(51) Int. Cl.[7] ............................. G02B 6/00; G02B 6/38
(52) U.S. Cl. .......................... 385/140; 385/60; 385/72; 385/78
(58) Field of Search ............................. 385/70, 72, 73, 385/76–78, 139, 140, 56, 58, 60

(56) References Cited

U.S. PATENT DOCUMENTS

| | | | | |
|---|---|---|---|---|
| 6,341,191 B1 | * | 1/2002 | Takahashi | 385/140 |
| 6,450,695 B1 | * | 9/2002 | Matsumoto | 385/60 |
| 6,522,485 B2 | * | 2/2003 | Jokura | 359/811 |
| 6,738,557 B2 | * | 5/2004 | Chang | 385/140 |
| 2004/0033028 A1 | * | 2/2004 | Cheng | 385/55 |

FOREIGN PATENT DOCUMENTS

| | | | | | |
|---|---|---|---|---|---|
| JP | 03025403 A | * | 2/1991 | ............ | G02B/6/00 |
| JP | 06294911 A | * | 10/1994 | ............ | G02B/6/00 |

* cited by examiner

*Primary Examiner*—Edward J. Glick
*Assistant Examiner*—Thomas R Artman
(74) *Attorney, Agent, or Firm*—Wei Te Chung

(57) ABSTRACT

An optical attenuator (100) has an optical attenuation fiber (1) doped with cobalt. Two ferrules (2A), (2B) retain the optical attenuation fiber therein. Two butting ends of the ferrules are enclosed in a flange (6), which is received in a front end of an interconnection housing (7). An alignment sleeve (4) retains a rear end of the rear ferrule and is enclosed in a rear end of the interconnection housing. A latch (8) engages with the rear end of the interconnection housing. A plug housing (9) engages with the front end of the interconnection housing. A cover (10) then attaches over all the aforesaid components. A front end of the front ferrule is exposed outside the cover, for connecting with a complementary optical connector.

10 Claims, 7 Drawing Sheets

OPTICAL ATTENUATOR

BACKGROUND OF THE INVENTION

1. Field of the Invention

The present invention relates to optical attenuators, and more particularly to fixed optical attenuators used in optical systems.

2. Description of Related Prior Art

Optical attenuators are widely used in optical transmission systems and optical networks. Optical attenuators are passive optical components that can reduce optical power propagating in optical fibers, and may be categorized as either fixed or variable attenuators.

FIG. 9 is a cross-sectional view of a fixed optical attenuator known in the prior art. A through hole 13 is bored in the central portion of a cylindrical ferrule 14. An optical attenuation fiber 15 is inserted into the through hole 13 and is glued to the inner surface thereof. Further, a flange 18 is fixed onto the circumferential surface of the ferrule 14. This flange 18 serves to limit the movement of the ferrule within the optical attenuator in the axial and circumferential directions.

In FIG. 9, a plug housing consists of body components 19 and 20. Further, an alignment sleeve 17 is provided in the component 20. An end part of the cylindrical ferrule 14 is inserted into one end of the alignment sleeve 17 and another end part of the ferrule 14 is connected to the component 19 in such a way that the component 19 inhibits the rotation of the flange 18. An outer thread 202 of the component 20 is engaged with an inner thread 192 of the component 19, thereby providing threaded engagement to fasten the components 19, 20 together. A coupling nut 16 is rotatably mounted on the component 19 of the plug housing.

In this design, the components 19 and 20 are fastened together by threaded engagement of the inner thread 192 and the outer thread 202. However, the threaded engagement between the components 19 and 20 is not reliable after long use. Furthermore, during assembly, the component 19 and/or the component 20 must be rotated to be fastened together, in such a way that it is difficult and inefficient to assemble the optical attenuator.

Thus, it is desired to provide a fixed optical attenuator which is robust and which can be assembled easily and efficiently.

SUMMARY OF THE INVENTION

Accordingly, an object of the present invention is to provide an optical attenuator which has a more firm and reliable engagement between components thereof.

Another object of the present invention is to provide an optical attenuator which can be assembled more easily and efficiently.

To achieve the above objects, an optical attenuator in accordance with the present invention comprises an optical attenuation fiber doped with cobalt, and two ferrules retaining the optical attenuation fiber therein. Two facing ends of the ferrules abut against each other and are enclosed in a flange, which is received in a front end of an interconnection housing. An alignment sleeve retains a rear end of the rear ferrule inserted in a rear end of the interconnection housing, and is also inserted into a front end of a latch, The latch engages with the rear end of the interconnection housing. A plug housing engages with the front end of the interconnection housing, and a cover then attaches over all the aforesaid components. A front end of the front ferrule is exposed outside the cover, for connecting with one complementary optical connector.

Other objects, advantages and novel features of the present invention will be drawn from the following detailed description of a preferred embodiment of the present invention with attached drawings, in which:

DETAILED DESCRIPTION OF PREFERRED EMBODIMENT

One preferred embodiment of an optical attenuator according to the present invention will be described in conjunction with the drawings.

Figure 2:
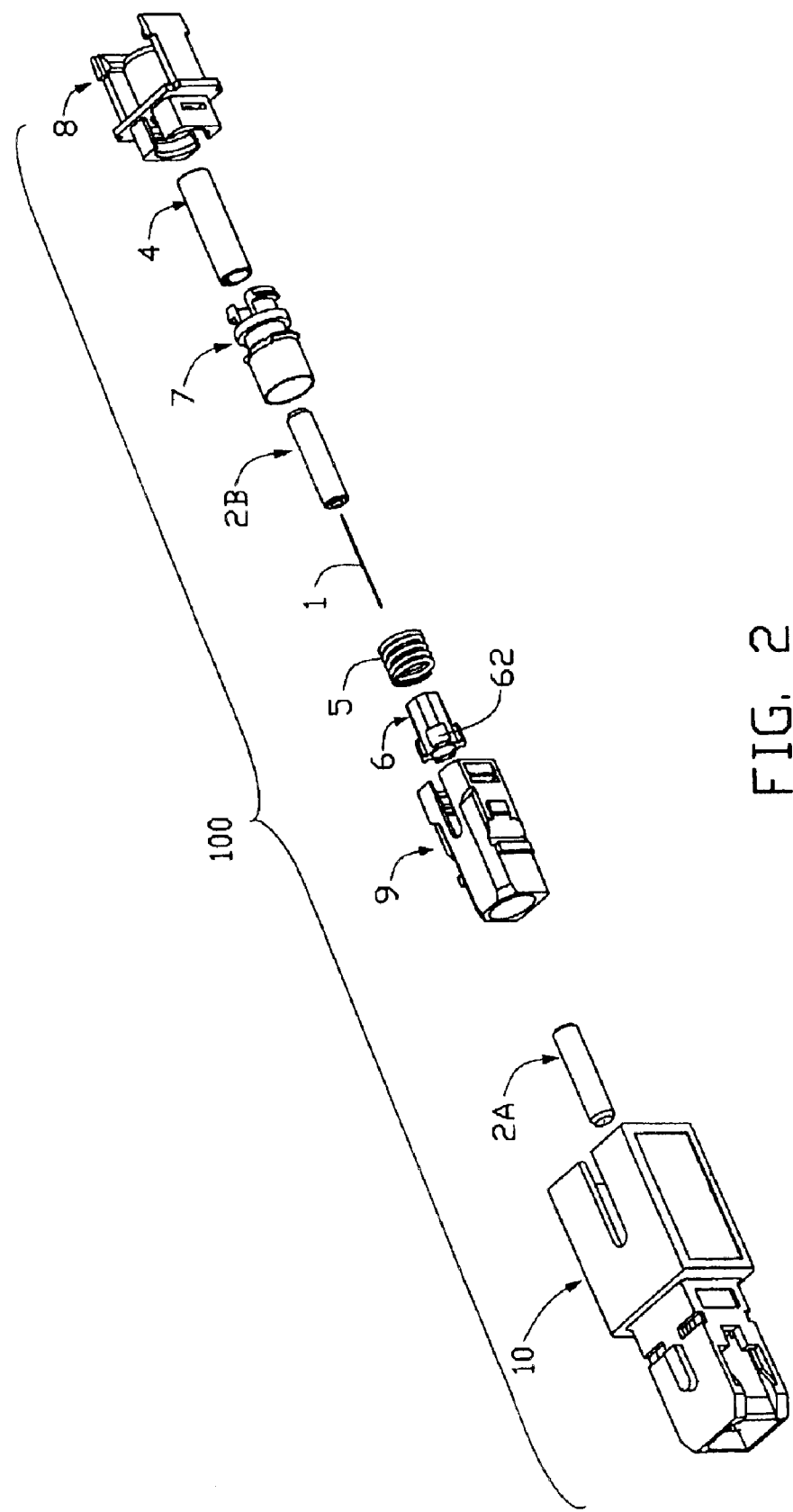
FIG. 2 is an exploded view of the optical attenuator of FIG. 1.

Referring to FIG. 2, an optical attenuator 100 comprises an optical attenuation fiber 1, two ferrules 2A, 2B, an alignment sleeve 4, a spring 5, a flange 6, an interconnection housing 7, a latch 8, a plug housing 9 and a cover 10.

The optical fiber 1 is doped with cobalt, or similar elements, and can attenuate by a predetermined amount a light beam propagating therethrough. The ferrules 2A and 28 are round rods, and each of them defines a through hole (not labeled) longitudinally therethrough for retaining the optical fiber 1. The flange 6 comprises four projections 62 formed on a front end thereof.

Figure 3:
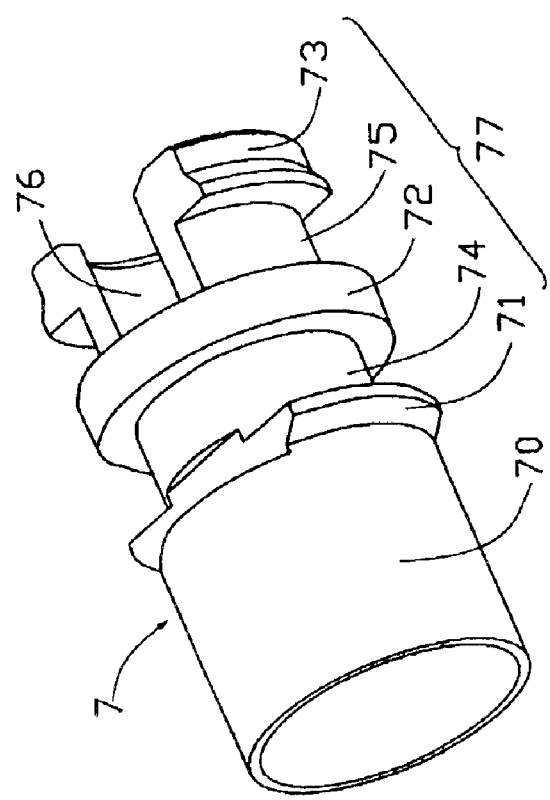
FIG. 3 is a perspective view of an interconnection housing of the optical attenuator of FIG. 1.

Referring to FIG. 3, the interconnection housing 7 comprises a tubular section 70, and a flange section 77 located rearward of the tubular section 70. A circumferential first flange 71, a circumferential second flange 72 and a circumferential third flange 73 are formed parallel to one another on the flange section 77, the third flange 73 being at a rear of the interconnection housing 2. A circumferential first groove 74 is defined between the first and second flanges 71, 72, and a circumferential second groove 75 is defined between the second and third flanges 72, 73. Furthermore, two cutouts 76 are longitudinally defined from the second flange 72 to a rear end of the interconnection housing 7. The two cutouts 76 are parallel and opposite to each other.

Figure 4:
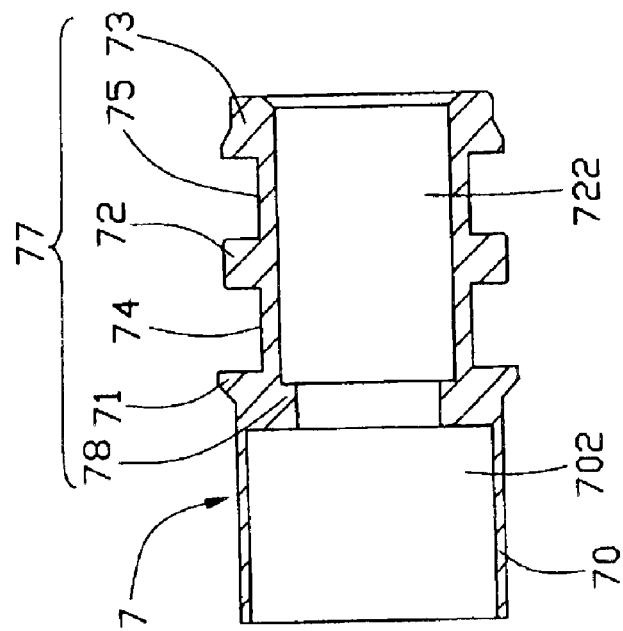
FIG. 4 is a cross-sectional view of the interconnection housing of FIG. 3.

Referring to FIG. 4, a first cavity 702 is defined in an interior of the tubular section 70, and a second cavity 722 in communication with the first cavity 702 is defined in an interior of the flange section 77. Diameters of the first and second cavities 702, 722 are different from each other, and a step 78 is formed between the first and second cavities 702, 722.

Figure 5:
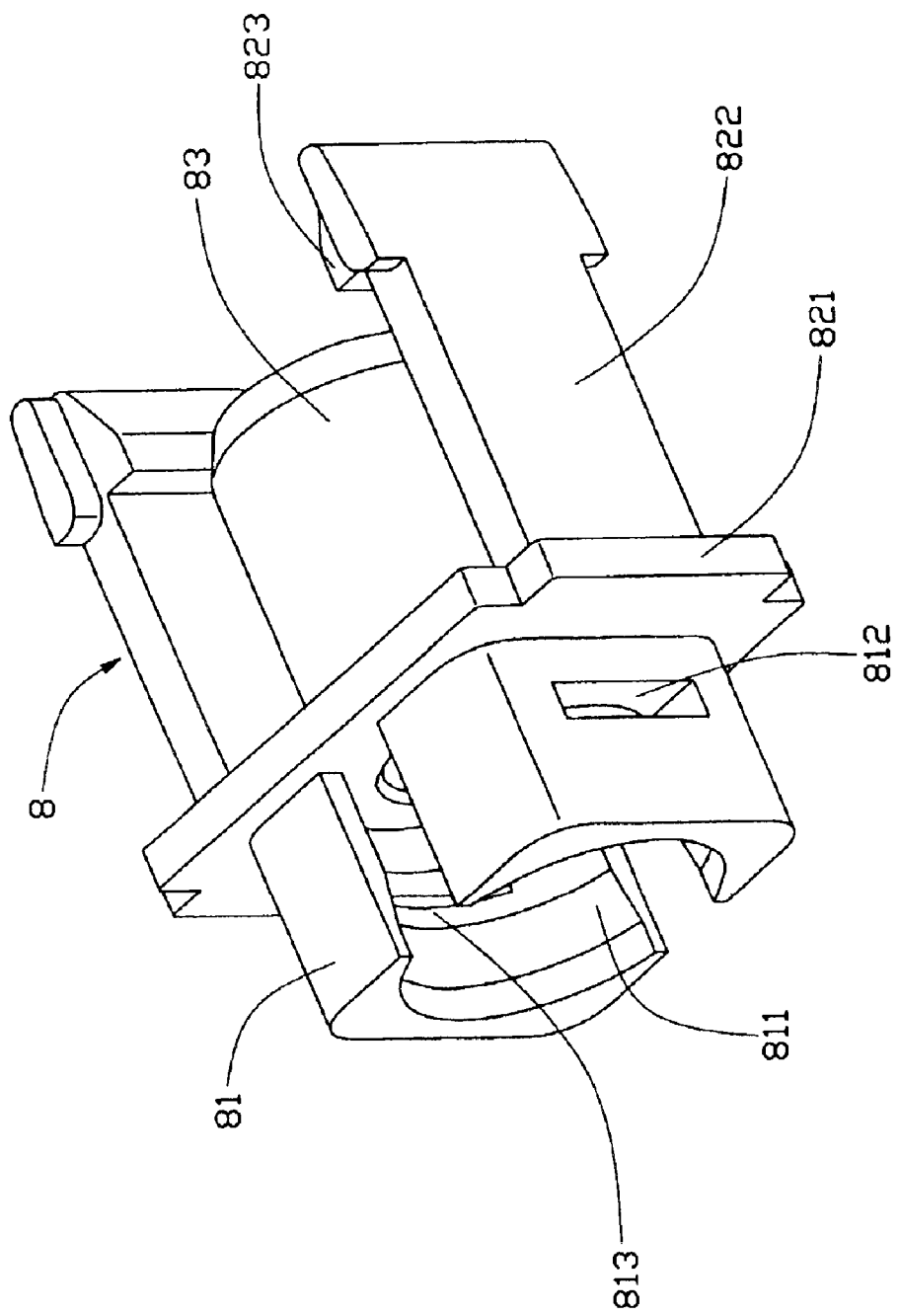
FIG. 5 is a perspective view of a latch of the optical attenuator of FIG. 1.

Referring to FIG. 5, the latch 8 comprises two semicircular sections 81, a plate 821, two opposite clamps 822 and a rear sleeve 83. The two opposite clamps 822 and the rear sleeve 83 protrude rearwardly from the plate 821, the clamps 822 being spaced to either side of the sleeve 83. A passage (not labeled) is defined in an interior of the rear sleeve 83, for retaining the alignment sleeve 4 (see FIG. 8). A locking tab 823 is inwardly formed on an inner surface of each clamp 822, for engaging with a complementary device (not shown). The semi-circular sections 81 project forwardly from the plate 821, and define a cylindrically shaped forward cavity 811 therebetween, for retaining a rear end of the interconnection housing 7 see FIG. 8). A circular through hole (not labeled) is defined through a center of the plate 821, communicating between the forward cavity 811 and the passage of the rear sleeve 83. A gap 812 is defined in each semi-circular section 81, for engagingly receiving the third flange 73 of the interconnection housing 7 see FIG. 8). A C-shaped beam 813 is formed in front of each gap 812 and on an inner surface of each semi-circular section 81, for engaging in the second groove 75.

Figure 7:
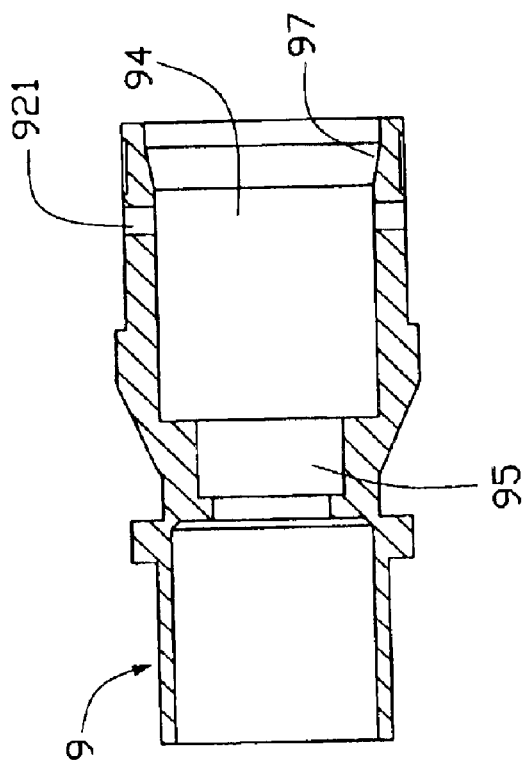
FIG. 7 is a cross-sectional view of the plug housing of FIG. 6.
Figure 6:
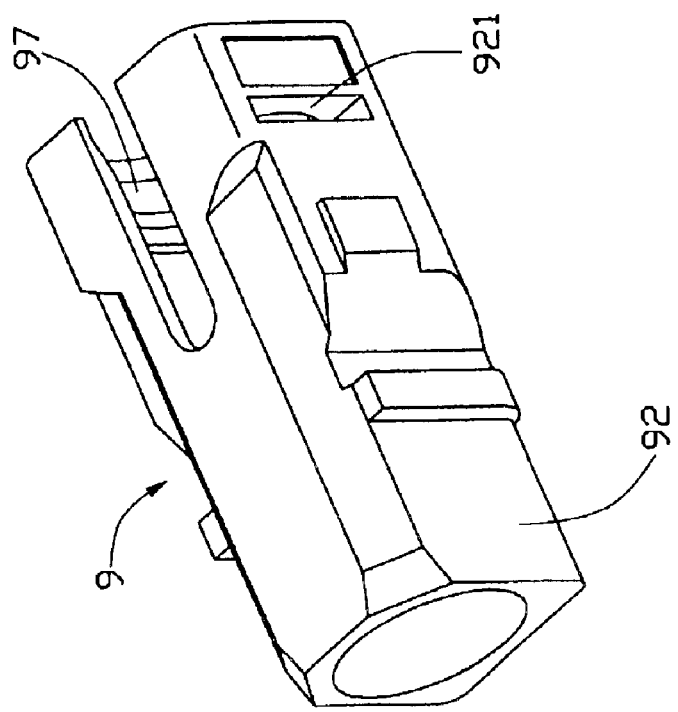
FIG. 6 is a perspective view of a plug housing of the optical attenuator of FIG. 1.

Referring to FIGS. 6 and 7, the plug housing 9 is generally rectangular in shape. A rectangular gap 921 is defined in a rear end of each sidewall 92, for engaging with the first flange 71 of the interconnection housing 7 see FIG. 8). A circumferential protrusion 97 is formed on an inner surface of a rear end of the plug housing 9, for engaging in the first groove 74 of the interconnection housing 7. A first chamber 94 is defined in the rear end of the plug housing 9, and a second chamber 95 in communication with the first chamber 94 is defined in a center of the plug housing 9. The second chamber 95 has a smaller diameter than the first chamber 94.

Figure 1:
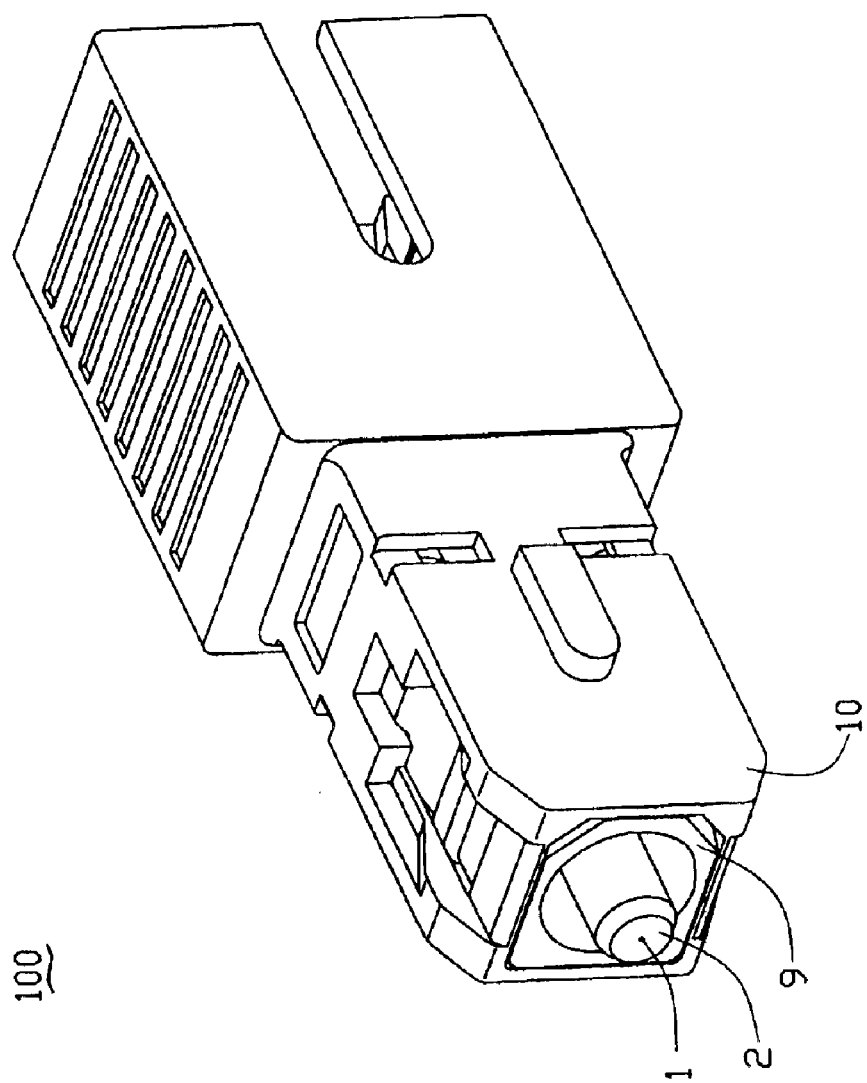
FIG. 1 is a perspective view of an optical attenuator in accordance with the present invention.
Figure 8:
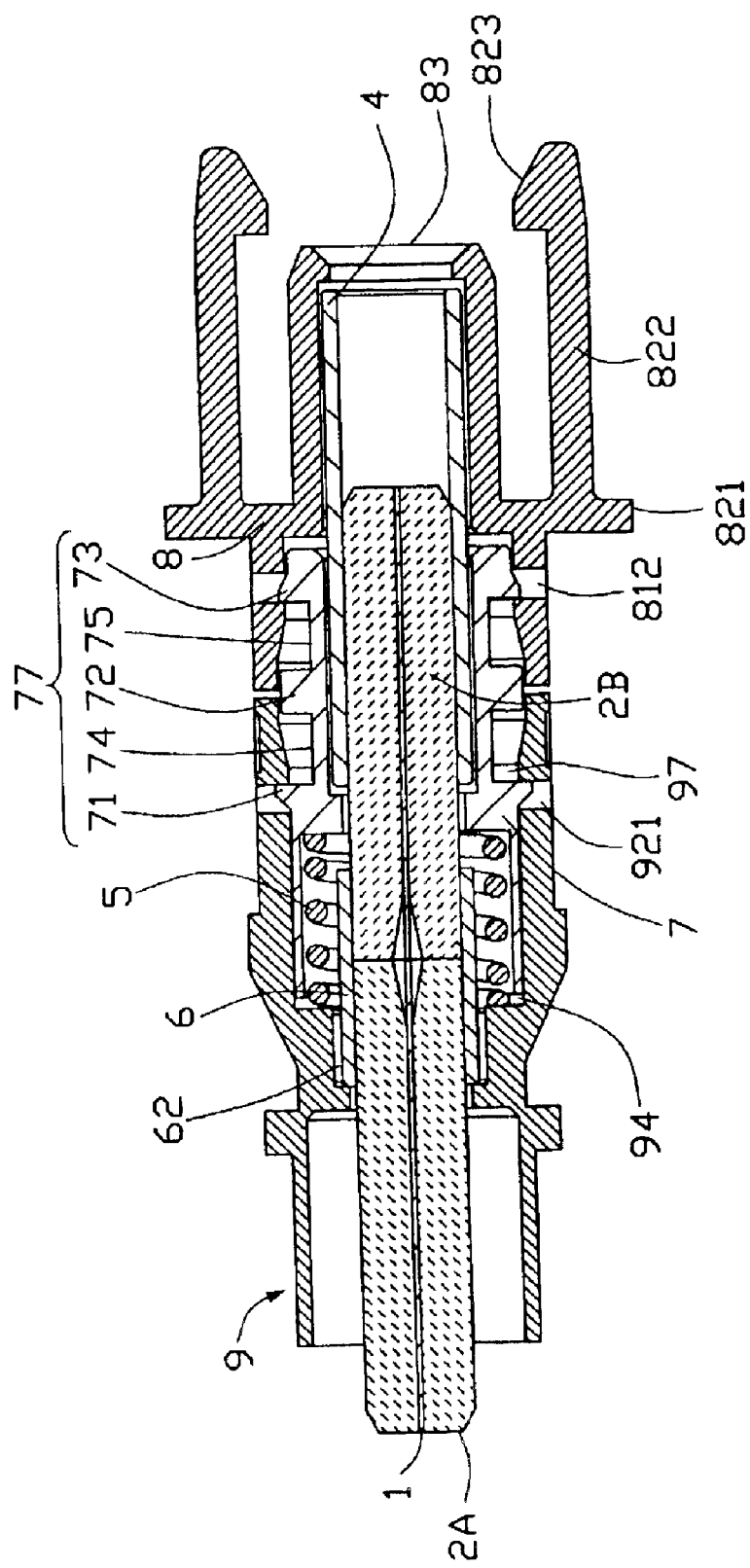
FIG. 8 is a cross-sectional view of the optical attenuator of FIG. 1.
Figure 9:
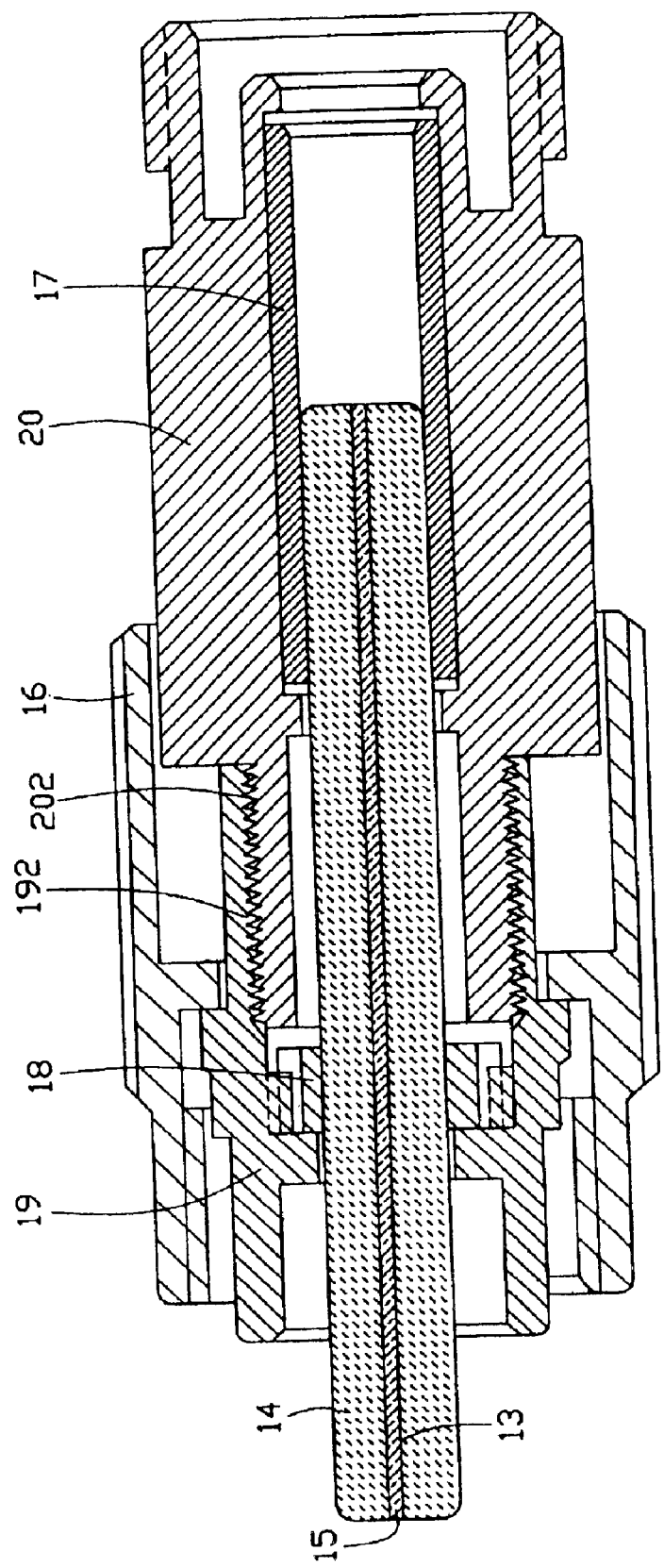
FIG. 9 is a cross-sectional view of a conventional optical attenuator.

Referring to FIGS. 1 and 8, in assembly, the optical fiber 1 is inserted into the ferrules 2A, 2B. The spring 5 encloses the flange 6. The ferrules 2A, 2B with the optical fiber 1 are fastened into the flange 6, with a rear end face of the ferrule 2A and a front end face of the ferrule 2B being abutted against one another. The optical fiber 1 is then glued in the ferrules 2A, 2B. The flange 6 with the ferrules 2A, 2B and the spring 5 is positioned into the first cavity 702 of the interconnection housing 7, with a rear end of the ferrule 2B and the optical fiber 1 passing through the interconnection housing 7. The alignment sleeve 4 encloses and is attached to a rear end of the ferrule 2B and is partially retained in the second cavity 722 of the interconnection housing 7, and the front end of the alignment sleeve 4 abuts the step 78. The latch 8 encloses a rear of the alignment sleeve 4, the rear of the alignment sleeve 4 protruding into the passage of the latch 8, and the latch 8 engages with the interconnection housing 7. The third flange 73 of the interconnection housing 7 is snapped into the gap 812 of the latch 8, with the C-shaped beams 813 of the latch 8 locked in the second groove 75, and a forward lip (not labeled) of each semi-circular section 81 of the latch 8 rides on the second flange 72 of the interconnection housing 7. Thus a reliable and firm engagement is provided between the latch 8 and the interconnection housing 7.

After that, the plug housing 9 encloses the tubular section 70 of the interconnection housing 7. Simultaneously, the circumferential protrusion 97 of the plug housing 9 is snapped into the first groove 74 of the interconnection housing 7, with a rear end of the protrusion 97 riding on the second flange 72, and the gaps 921 lockingly receive the first flange 71, thereby fastening the interconnection housing 7 and the plug housing 9 together. Moreover, the four projections 62 of the flange 6 are retained in the second chamber 95 of the plug housing 9, which serves to prevent the ferrules 2A, 2B from rotating.

Finally, the cover 10 is retainingly attached over all the aforesaid components. A front end of the ferrule 2A is exposed outside the cover 10, for connecting with one complementary optical connector (not shown).

Compared with the conventional optical attenuator, the optical attenuator 100 of the present invention, using the interconnection housing 7 to fasten the latch 8 and the plug housing 9 together, is more firm and reliable and can be assembled more easily and efficiently.

Although the present invention has been described with specific terms, it should be noted that the described embodiment is not necessarily exclusive, and that various changes and modifications may be made thereto without departing from the scope of the present invention as defined in the appended claims.

What is claimed is:

1. An optical attenuator comprising:
   an optical attenuation fiber;
   a first ferrule retaining a forward part of the optical attenuation fiber therein;
   a second ferrule located rearward of the first ferrule and retaining a rearward part of the optical attenuation fiber therein, a rearward end of the first ferrule abutting against a forward end of the second ferrule;
   a flange retaining the two abutting ends of the ferrules therein;
   a spring surrounding the flange;
   an alignment sleeve retaining a rear end of the second ferrule therein;
   an interconnection housing, a front end of the interconnection housing defining a first cavity accepting the flange and the spring therein, a rear end of the interconnection housing defining a second cavity accepting a front end of the alignment sleeve therein;
   a latch attached to the rear end of the interconnection housing, the latch defining a passage receiving a rear end of the alignment sleeve therein; and
   a plug housing attached to the front end of the interconnection housing.

2. The optical attenuator in accordance with claim 1, wherein a rear end of the plug housing defines a first chamber within which the front end of the interconnection housing is retained.

3. The optical attenuator in accordance with claim 2, wherein a center of the plug housing defines a second chamber in communication with the first chamber, and projections formed at a front end of the flange are received within the second chamber.

4. The optical attenuator in accordance with claim 1, wherein a first flange, a second flange and a third flange are formed in order on the interconnection housing, the third flange being at the rear of the interconnection housing, a first groove being defined between the first and second flanges, and a second groove being defined between the second and third flanges.

5. The optical attenuator in accordance with claim 4, wherein a front end of the latch defines two gaps and forms a C-shaped beam in front of each gap, the gaps retain the third flange of the interconnection housing therein, and the C-shaped beams are engaged within the second groove of the interconnection housing.

6. The optical attenuator in accordance with claim 4, wherein the rear end of the plug housing comprises two gaps defined in sidewalls thereof and a protrusion formed behind the gaps on the inner surface of the sidewalls, and the gaps retain the first flange of the interconnection housing therein, and the protrusion engages within the first groove of the interconnection housing.

7. An optical attenuator comprising:

first and second ferrules commonly retaining an optical attenuator fiber therein and defining an axial direction thereof;

a flange circumferentially retained to the first and second ferrules without relative axial movement along said axial direction;

an interconnection housing connecting a plug housing and a latch together to commonly enclose the first and second ferrules and the flange therein; and a spring radially located between the plug housing and the flange, and providing an axial biasing force along said axial direction with two ends of the spring biasing against the plug housing and the interconnection housing for buffering the first ferrule.

8. The attenuator in accordance with claim 7, wherein said interconnection housing further includes a tubular section between the spring and the housing.

9. An optical attenuator comprising:

first and second ferrules commonly retaining an optical attenuator fiber therein and defining an axial direction thereof;

a flange circumferentially retained to the first and second ferrules without relative axial movement along said axial direction;

an alignment sleeve, a distal end portion of the first ferrule being radially exposed to an exterior, and a distal end portion of the second ferrule being enclosed by the alignment sleeve; and a spring radially surrounding the flange and also providing biasing force along said axial direction with two ends of the spring biasing against a plug housing and an interconnection housing for buffering the first ferrule.

10. The attenuator in accordance with claim 9, wherein a housing assembly retainably surrounds the first and second ferrules and the associated flange and the spring, the housing assembly comprises the plug housing, the interconnection housing and a latch, and two opposite ends of the housing assembly at the distal end portions of the first ferrule and the second ferrule, respectively, are complementary with each other.

* * * * *